United States Patent
Dormaier (10) Patent No.: US 8,002,359 B2
(45) Date of Patent: Aug. 23, 2011

(54) DUMP BED DOOR SEAL

(76) Inventor: Rusty Dormaier, Newport, WA (US)

( * ) Notice: Subject to any disclaimer, the term of this patent is extended or adjusted under 35 U.S.C. 154(b) by 405 days.

(21) Appl. No.: 12/288,991

(22) Filed: Oct. 24, 2008

(65) Prior Publication Data
US 2009/0108610 A1 Apr. 30, 2009

Related U.S. Application Data (60) Provisional application No. 61/000,574, filed on Oct. 29, 2007.

(51) Int. Cl.
*B60P 1/56* (2006.01)

(52) U.S. Cl. ......... 298/23 R; 298/1 B; 298/1 R; 298/27; 296/146.9; 277/590

(58) Field of Classification Search ............ 298/1 B, 298/1 R, 23 R, 23 MD, 23 D, 23 DF, 25, 298/27, 29; 160/368.1; 220/234; 296/102, 296/106, 50, 56, 146.9; 277/346, 590, 644, 277/645, 640, 651, 921; 49/495.1, 498.1, 49/479.1, 499.1
See application file for complete search history.

(56) References Cited

U.S. PATENT DOCUMENTS

| | | | |
|---|---|---|---|
| 2,679,335 A | 5/1954 | Bell | |
| 2,682,975 A | 7/1954 | Stoner | |
| 4,772,072 A | 9/1988 | Vick, Jr. | |
| 4,923,074 A | 5/1990 | Johnston | |
| 6,286,888 B1 | 9/2001 | Essig | |
| D480,333 S | 10/2003 | Allison | |
| 6,932,433 B2 * | 8/2005 | Heider et al. | 298/27 |
| 2006/0006686 A1 | 1/2006 | Schmeichel | |
| 2007/0063526 A1 | 3/2007 | Poudrier | |

FOREIGN PATENT DOCUMENTS

| | | |
|---|---|---|
| DE | 3113722 A1 | 10/1982 |
| JP | 54029423 | 7/2004 |
| JP | 2006015944 A | 1/2006 |

\* cited by examiner

*Primary Examiner* — Stephen Gordon
(74) *Attorney, Agent, or Firm* — William A. Jeckle; Lukins & Annis, P.S.

(57) ABSTRACT

A seal for a dump bed door provides a resiliently deformable elongate sealing member having a planar portion and a resiliently deformable cylindrically enlarged bulbous portion defining a medial channel at one elongate edge. An anchoring strap communicating with the planar portion and fasteners extending through spacedly arrayed holes defined therein fasten the sealing member to an edge portion of the dump bed door with a portion of the bulbous portion overhanging the edge of the dump bed door. Closing the dump bed door causes the overhanging bulbous portion to frictionally engage with and "pop" up onto the adjoining dump bed surface. Weight of material carried within the dump bed deforms the elongate sealing member and bulbous portion providing a seal between the dump bed door and the adjoining dump bed surface of a closed dump bed door.

18 Claims, 8 Drawing Sheets

DUMP BED DOOR SEAL

RELATED APPLICATIONS

This application claims the benefit of earlier filed U.S. Provisional Patent Application No. 61/000,574 filed on Oct. 29, 2007.

BACKGROUND OF THE INVENTION

1. Field of Invention

This invention relates to land vehicles, and more particularly to a seal for dump bed doors that prevents leakage of material through gaps, bends and irregular openings between the dump bed door and an adjoining surface.

2. Background and Description of Prior Art

A common problem with vehicles having dump beds, primarily "belly dump" trucks and "dump trucks" is that they leak material from the dump bed onto the roadway. This problem is also prevalent with over the road and railroad type hopper vehicles such as the type that carry grain, sawdust, coal and other bulk goods.

Such leaks are dangerous because rocks, gravel, sand and the like leaking onto the roadway from a moving vehicle may become airborne projectiles leading to injuries, broken windshields, accidents and other undesirable occurrences. A small continuous leak over a period of time may also lead to loss of a substantial quantity of product such as grain.

Various federal and state agencies including Departments of Transportation (DOT) prohibit vehicles that are leaking material from operating on roadways because of the risks caused thereby. Owners and operators of vehicles having leaking dump beds are subject to significant fines and other penalties. For instance leakage of coal onto railroad track beds has lead to the designation of some railroad track beds as hazardous waste sites.

Leaks most frequently occur because there are gaps between a dump bed door and an adjoining surface against which the dump bed door is normally retained in a sealed relationship. Bends, gouges, dents and irregular openings may be formed in the dump bed door and adjoining surfaces when material such as grain, rocks, gravel, sand, coal, asphalt and the like is dropped into the dump bed during loading. The impact of material dropped into the dump bed, and the stresses caused by the weight thereof, frequently causes bends and the like in the dump bed doors, tailgates and adjoining surfaces creating undesirable gaps that prevent the dump bed doors, tailgates and door panels from flushly seating against adjoining surfaces to prevent leaks. Such damage may also loosen the attachment of the dump bed doors and tailgates such that the dump bed doors and tailgates vibrate and shake during vehicle operation accentuating wear and tear that may increase the size of any gaps and openings as well as cause build up of static electricity which may lead to fire risks. As can be expected, older belly dump trucks, dump trucks and hopper type vehicles are more prone to leakage than newer vehicles.

Various apparatus and seals to prevent material contained in a dump bed from leaking therefrom are known, but such apparatus and seals all have drawbacks. Known apparatus include troughs and pans that are carried below the dump bed opening to catch material falling therefrom. Known seals include inflatable bladders that require a pneumatic system to operate and are subject to being punctured. Other known seals are gaskets that require placement directly between two closely adjacent opposing surfaces to be squeezed therebetween.

What is needed is a device that effectively seals gaps and irregular openings between a dump bed door and adjoining dump bed surface to prevent leakage of materials therethrough. The device must be durable, easy to install and must seal existing gaps as well as newly formed gaps and irregular openings including small gaps through which particulate matter, such as sand, may leak.

My dump bed door seal resolves various of the aforementioned drawbacks and provides a seal for repetitively opening dump bed doors that prevents leakage of material carried within the dump bed through gaps, bends and irregular openings between a dump bed door and an adjacent dump bed door or dump bed surface. My seal is retrofittable on dump beds to seal existing gaps, bends and irregular openings and is resiliently deformable to seal new gaps, bends and irregular openings that develop even after the sealing member is installed. My dump bed door seal is durable, it is easy to install and it does not require a pneumatic system. My dump bed door seal may be installed in the field with commonly available tools and does not require positioning directly between two adjacent opposing surfaces so as to be compressed therebetween to form a seal. Further, my dump bed door seal is not affected by heated material, such as asphalt and readily seals openings through which small particulate matter such as grain, sand, saw-dust and the like may leak.

My invention does not reside in any one of the identified features individually but rather in the synergistic combination of all of its structures, which give rise to the functions necessarily flowing therefrom as hereinafter specified and claimed.

SUMMARY

A dump bed door seal generally provides an elongate resiliently deformable sealing member having a planar portion and a resiliently deformable cylindrically enlarged bulbous portion at one elongate edge defining a medial channel therethrough. Plural fasteners extending through spacedly arrayed holes defined in an anchoring strap and the planar portion to fasten the sealing member to an edge portion of a dump bed door with a portion of the bulbous portion overhanging terminal edge of the dump bed door. Closing the dump bed door causes the overhanging bulbous portion to frictionally engage with, and "pop up" onto, the adjoining dump bed surface. Weight of material carried within the dump bed deforms the bulbous portion by compressing the bulbous portion against the dump bed surface providing a seal that prevents material from leaking from the dump bed when the dump bed door is closed.

In providing such an apparatus it is:

a principal object to provide a seal for a repetitively opening and closing dump bed door that prevents leakage of material contained within the dump bed through gaps between the dump bed door and adjoining dump bed surface when the dump bed door is closed.

a further object to provide a seal for dump bed doors of belly-dump type vehicles.

a further object to provide a seal for tailgates of a dump beds carried by dump truck type vehicles.

a further object to provide a seal for sliding panel doors of hopper type vehicles.

a further object to provide a seal that seals gaps, bends, dents, irregular and undesirable openings between a dump bed door and an adjoining dump bed surface.

a further object to provide a seal that seals gaps, bends, dents, irregular and undesirable openings between two cooperatively closing dump bed doors.

a further object to provide a dump bed door seal that is durable, wear resistant and maintenance free.

a further object to provide a dump bed door seal that may be installed in the field.

a further object to provide a dump bed door seal that is not squeezed between adjacent door surfaces by closing the dump bed door.

a further object to provide a dump bed door seal that is easily replaceable.

a further object to provide a dump bed door seal having physical characteristics that are customizable to the characteristics of the material carried within the dump bed.

a further object to provide a dump bed door seal that uses weight of material carried within the dump bed to create a seal.

a further object to provide a dump bed door seal that seals existing gaps, bends and undesirable openings between a dump bed door and an adjoining dump bed surface.

a further object to provide a dump bed door seal that seals gaps, bends and undesirable openings between a dump bed door and adjoining dump bed surface that develop after the dump bed door seal is installed.

a further object to provide a dump bed door seal that uses force vectors created by the closing of the dump bed door to position the seal.

a still further object to provide a dump bed door seal that is of new and novel design, of rugged and durable nature, of simple and economic manufacture and one that is otherwise well suited to the uses and purposes for which it is intended.

Other and further objects of my invention will appear from the following specification and accompanying drawings which form a part hereof. In carrying out the objects of my invention it is to be understood that its structures and features are susceptible to change in design and arrangement with only one preferred and practical embodiment of the best known mode being illustrated in the accompanying drawings and specified as is required.

BRIEF DESCRIPTIONS OF DRAWINGS

In the accompanying drawings which form a part hereof and wherein like numbers refer to similar parts throughout.

DESCRIPTION OF PREFERRED EMBODIMENT

My dump bed door seal generally provides a resiliently deformable sealing member 12, an anchoring strap 20 and plural fasteners 22 for affixing the sealing member 12 and anchoring strap 20 to an edge portion of a dump bed door 31.

The sealing member 12 is preferably formed of high density plastic, such as polyethylene, nylon, vinyl or similar material that is resiliently deformable, has retentive memory, and has smooth outer surfaces so that material carried within a dump bed 30 does not adhere to the sealing member 12. It is also preferable the sealing member 12 be formed of a material having a high vicat point so that the sealing member 12 is not adversely affected by heated materials such as asphalt carried within the dump bed 30. Polyethylene, nylon, vinyl and other like materials may be manufactured with these desirable characteristics.

Figures 1, 2:
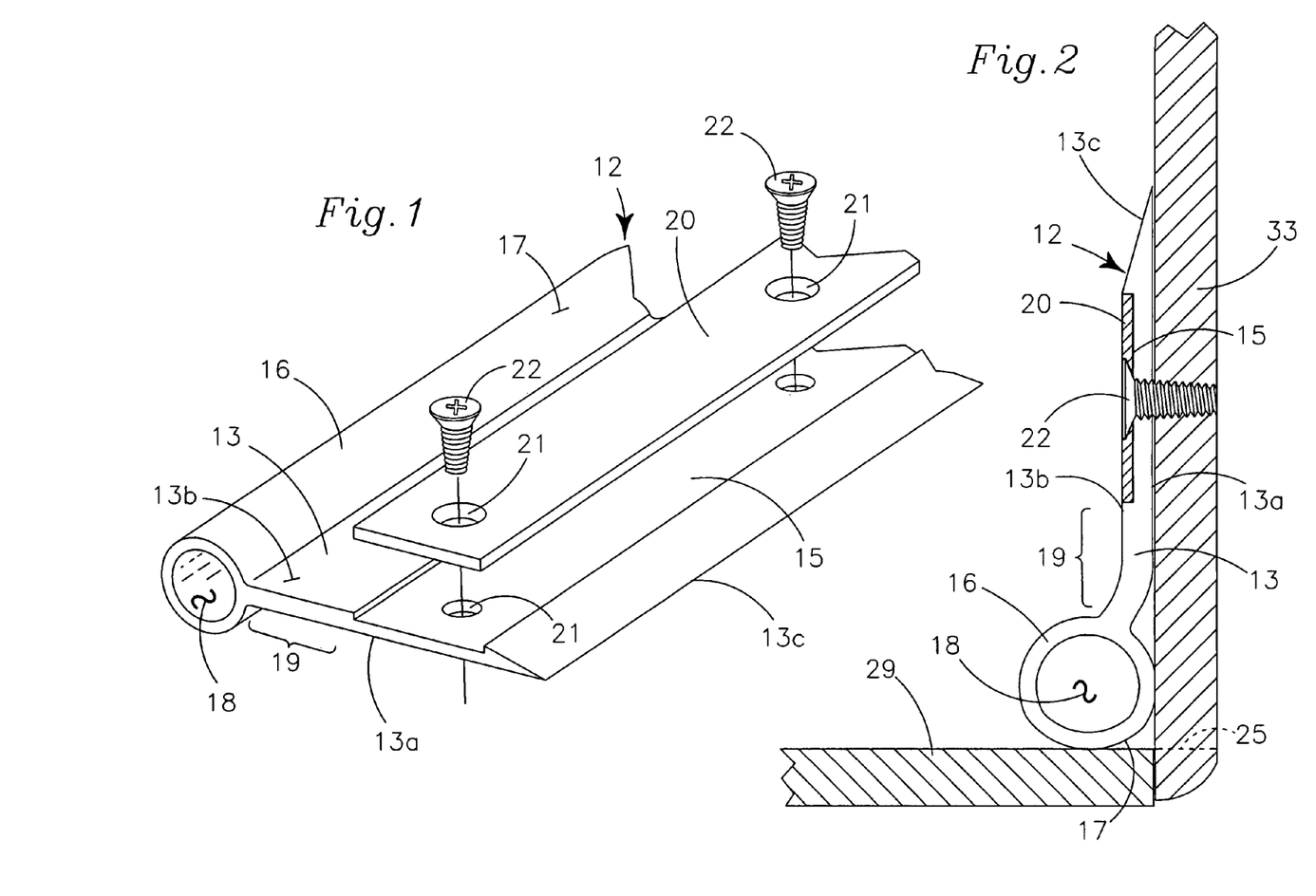
FIG. 1 is an isometric side and end view of my dump bed door seal.
FIG. 2 is an orthographic cross section view of my dump bed door seal installed on a closed dump bed tailgate.
Figure 3:
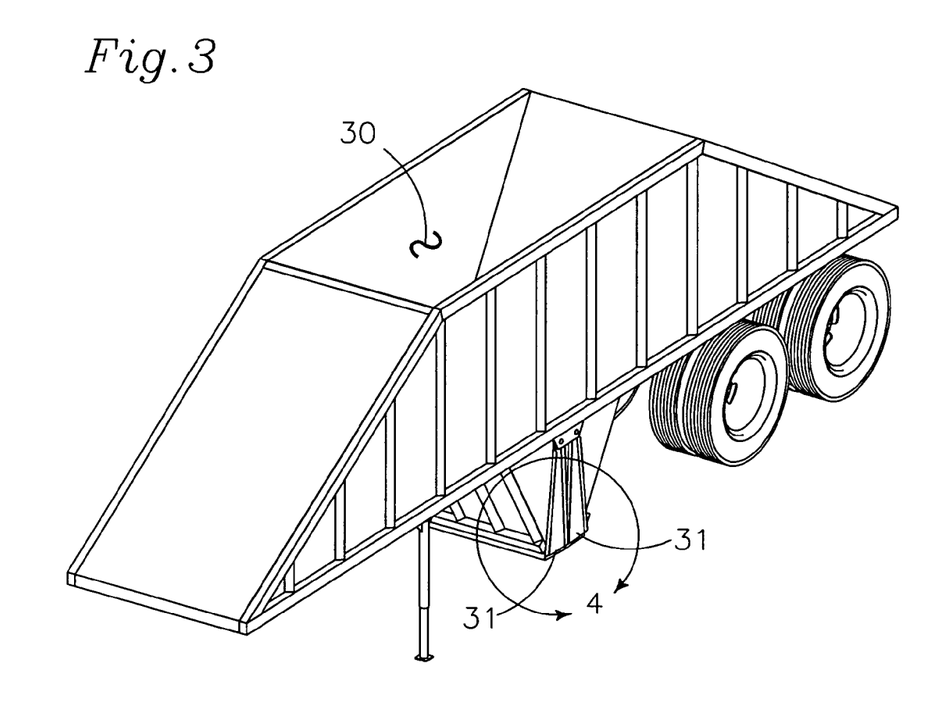
FIG. 3 is an isometric top, front and side view of a belly dump type vehicle on which my dump bed door seal may be installed.
Figure 8:
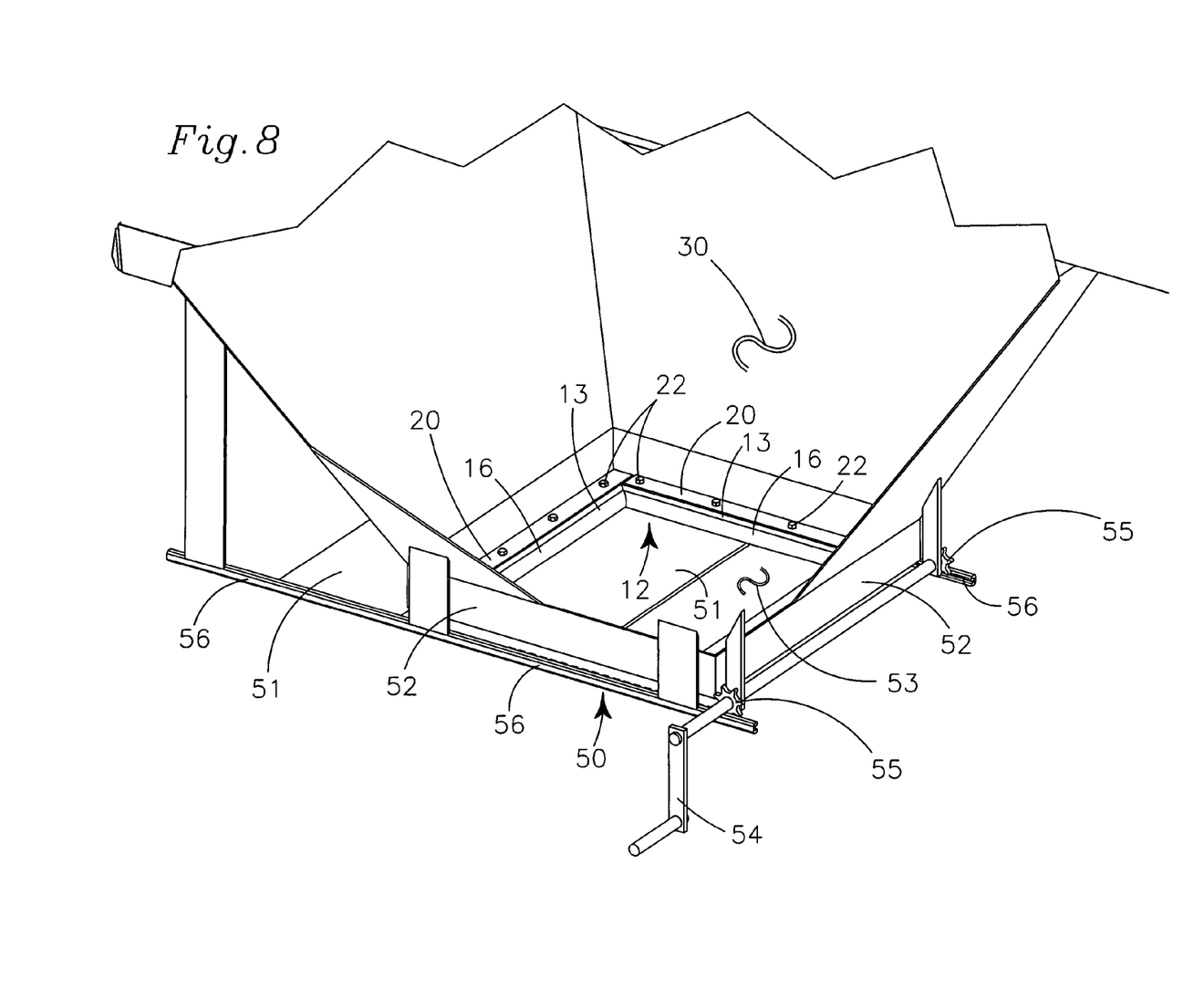
FIG. 8 is an enlarged partial cut-away isometric view of a sliding panel door such as the type shown in FIG. 7 showing the dump bed door seal installed around the perimeter of a door opening.

As shown in FIGS. 1 and 2, the sealing member 12 has an elongate generally planar portion 13 and a cylindrically enlarged bulbous portion 16 along one elongate edge. The planar portion 13 has a first side 13a, an opposing second side 13b and a tapered elongate edge 13c opposite the bulbous portion 16. When the sealing member 12 is affixed to an edge portion of a dump bed door 31 or tailgate 33, the first planar side 13a is immediately adjacent the dump bed door 31, tailgate 33 or frame 52 of a sliding panel hopper door. (FIG. 8). The planar portion 13 may define an arc (not shown) between the tapered edge 13c and the bulbous portion 16 to enhance sealing when affixed to the dump bed door 31.

Elongated recess 15 is defined in the second side 13b of the planar portion 13 and the anchoring strap 20 is carried within the recess 15 providing a smooth surface that is unlikely to catch material passing thereover. Plural spacedly arrayed holes 21 are defined in the anchoring strap 20 and in the planar portion 13 for fasteners 22 to extend therethrough so that a portion of the planar portion 13 is "sandwiched" between the anchoring strap 20 and the dump bed door 31, the tailgate 33, or the sliding panel hopper door frame 52. (See FIGS. 2, 4 and 8). Anchoring strap 20 is preferably formed of spring steel or similar strong yet flexible material that is corrosion resistant. Fastener holes 21 are preferably punched through the anchoring strap 20.

Figure 4:
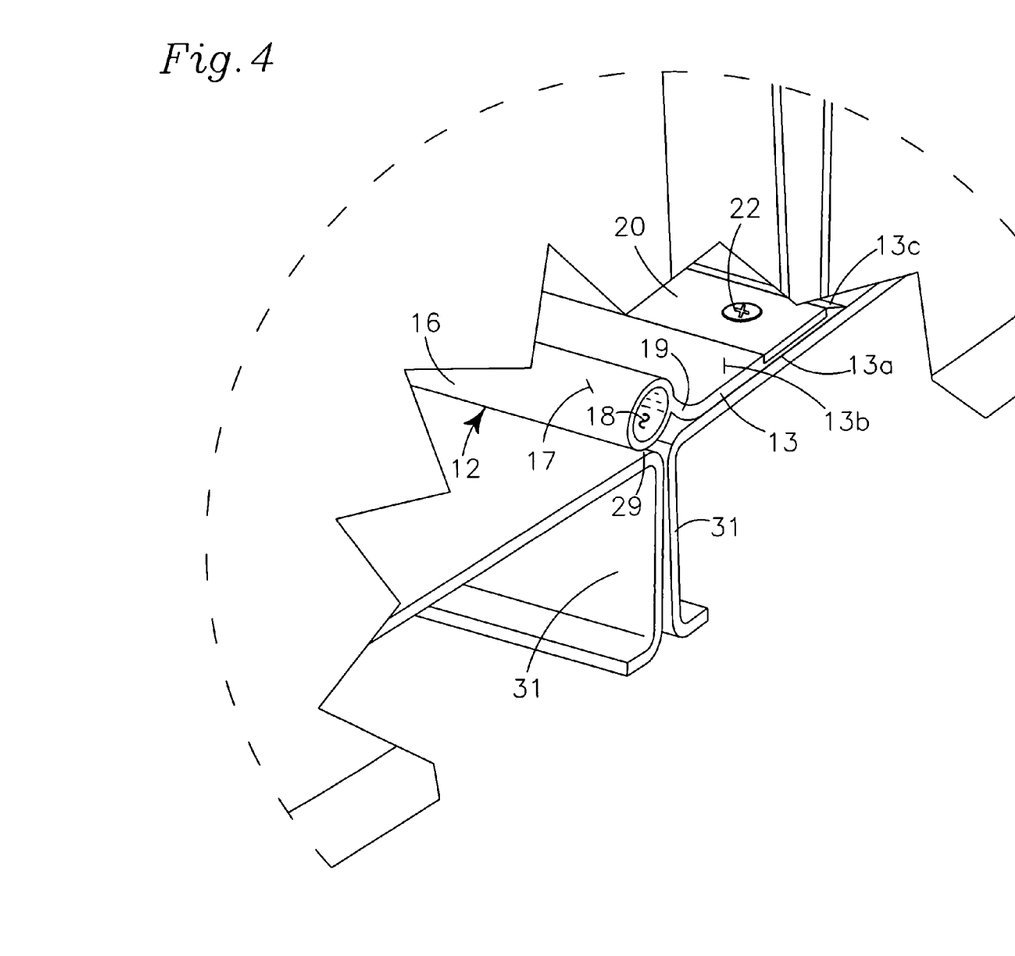
FIG. 4 is an enlarged partial cut-away isometric view of my dump bed door seal installed on a closed belly dump door such as the type shown in FIG. 3.

The cylindrically enlarged bulbous portion 16 is generally circular in cross-section, has an outer circumferential surface 17 and defines a medial channel 18 extending therethrough. The resiliently deformable material, of which the sealing member 12 is made, allows the bulbous portion 16 and adjacent flexing area 19 of the planar portion 13 to bend, flex and deform as the bulbous portion 16 engages with and disengages from adjoining dump bed surface 29 which may be a cooperating dump bed door. (FIGS. 2 and 4). The flexing area 19 is the portion of the planar portion 13 generally between the bulbous portion 16 and proximate edge of the anchoring strap 20. The retentive memory of the sealing member material causes the bulbous portion 16 and the flexing portion 19 to substantially return to an original configuration once any deforming forces are relieved therefrom.

In a second embodiment (FIGS. 5, 9 and 10), the sealing member 12 is formed of the same resiliently deformable material with retentive memory but has a cross-section similar to a "tear drop". A first planar side portion 24a and a second planar side portion 24b each communicate with spaced apart portions of the bulbous portion 16, and converge opposite the bulbous portion 16 to a tapered elongate edge 26. In the second embodiment the anchoring strap 20 is integrally formed into the sealing member 12 between the first planar side portion 24a and the second planar side portion 24b. Plural fastener holes 21 defined in the planar sides 24a, 24b and anchoring strap 20 carry fasteners 22 for affixing the sealing member 12 to the dump bed door 31, tailgate 33 or frame 52 of a sliding panel door. Because the first and second planar sides 24a, 24b are similar, either planar side 24a, 24b may be positioned immediately adjacent the dump bed door 31, tailgate 33, or frame 52 of a sliding panel hopper door for attachment.

Figure 5:
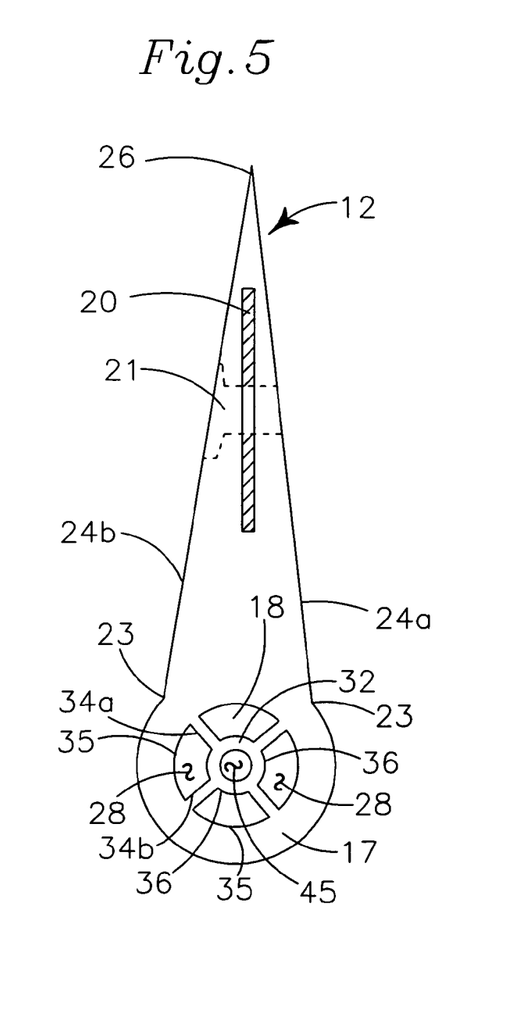
FIG. 5 is an orthographic cross section view of a second embodiment of my dump bed door seal carrying a rigidity enhancing structure in the medial channel.
Figure 10:
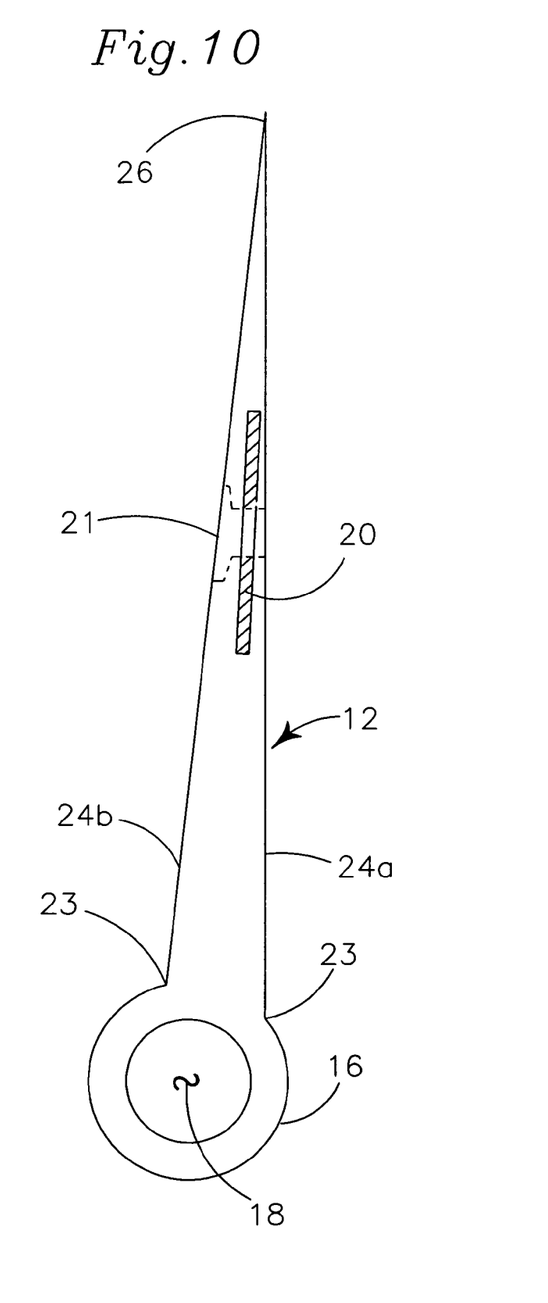
FIG. 10 is an orthographic cross section view similar to that of FIG. 5, less the rigidity enhancing structure, having elongated planar sides and differing angles at intersection of planar sides and bulbous portion to alter the flexing characteristics.

As shown in FIG. 5 and FIG. 10, the dimensions of the planar side portions 24a, 24b may be varied, such as elongated, to modify angle 23 where the planar side portions 24a, 24b interconnect with the bulbous portion 16. Changing angle 23 responsively changes the flexing characteristics of the sealing member 12 caused by force vectors acting upon the bulbous portion 16 when the dump bed door 31 closes.

Figure 6:
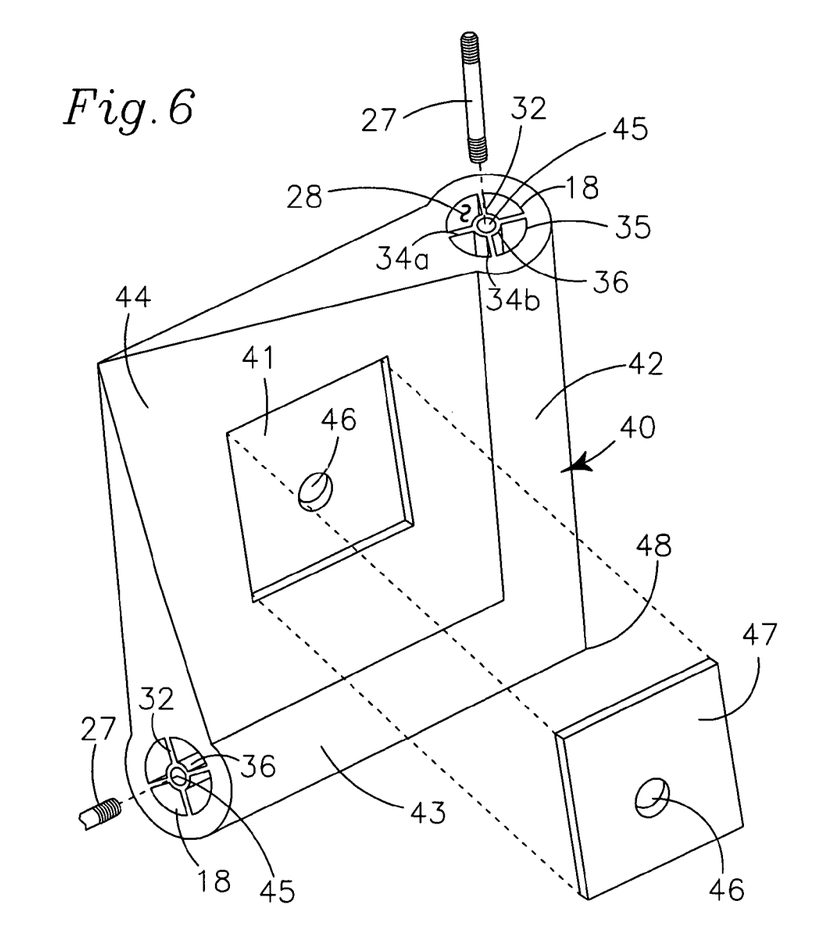
FIG. 6 is an isometric top and side view of a corner seal.

As shown in FIGS. 5 and 6, a rigidity enhancing structure 32 may be removably or permanently carried in the medial channel 18. The rigidity enhancing structure 32 defines a central axially aligned dowel channel 45 and plural sector shaped channels 28 spaced about the central dowel channel 45. Each sector shaped channel 28 has an inner arc edge 36, an outer arc edge 35 and two radially aligned sides 34a, 34b communicating between the inner arc edge 36 and the outer arc edge 35. The rigidity enhancing structure 32 adds structural rigidity to the bulbous portion 16 and limits deformation thereof when compression forces are exerted on the bulbous portion 16, such as by a load of material within the dump bed 30. The radial position of the sector shaped channels 28 may be adjusted during manufacture of the sealing member 12 or during insertion of the rigidity enhancing structure 32 into the medial channel 18 to concentrate deformation of the bulbous portion 16 as desired. As shown, the sector shaped channels 28 are positioned as shown in FIG. 5 with one sector shaped channel 28 at the 9:00 position, one at the 3:00 position, one at the 12:00 position and one at the 6:00 position. The 3:00, 6:00, 9:00 and 12:00 positioning of the sector shaped channels 28 concentrates deformation of the bulbous area 16 at positions adjacent the planar sides 24a, 24b. Changing the radial position of the sector shaped channels 28 concentrates deformation at another radial position.

Figure 9:
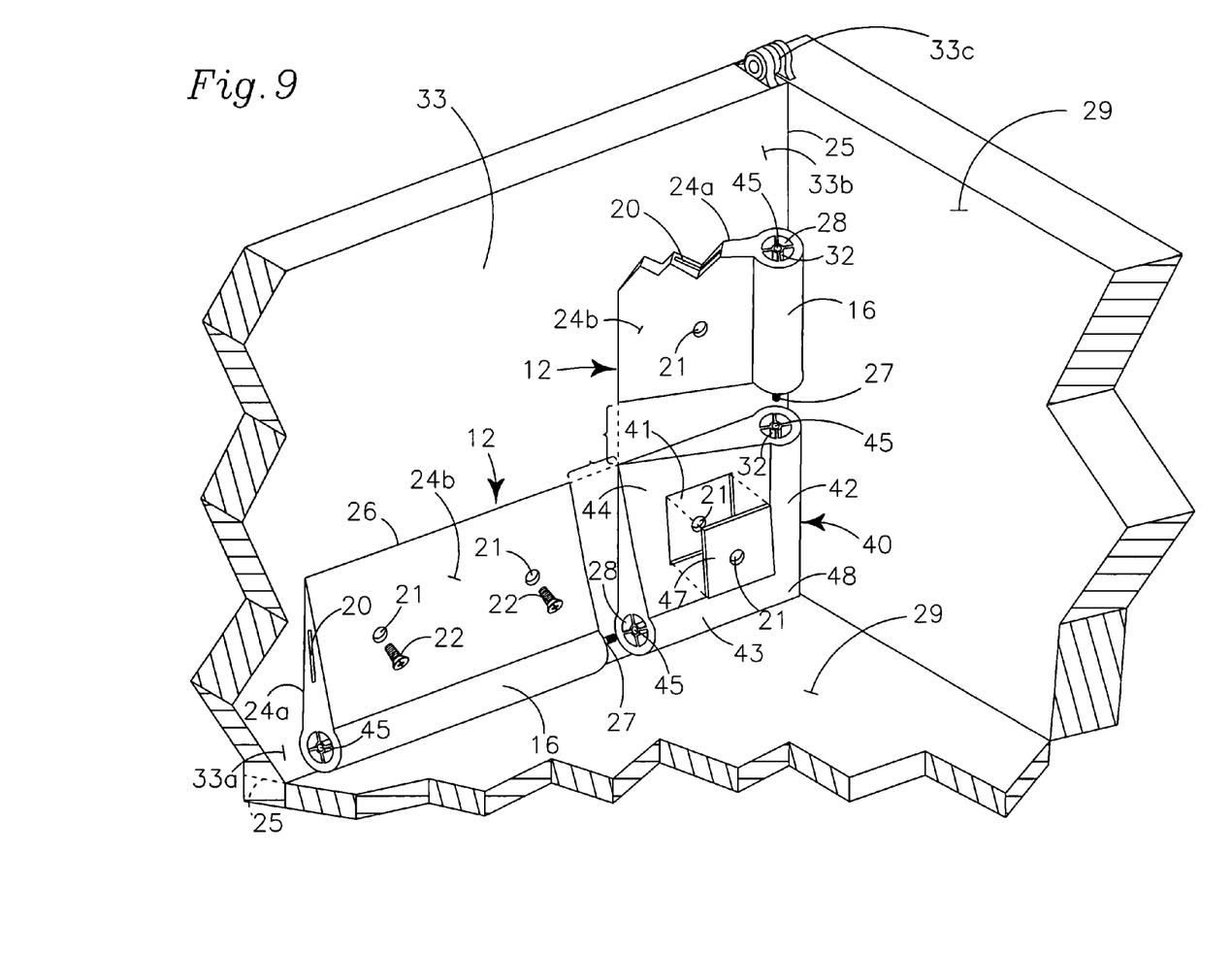
FIG. 9 is an exploded isometric top, front and side view of a corner seal and two adjacent sections of sealing member positioned for installment on an inside corner of a top hinged dump truck tailgate.

As shown in FIG. 9, when the dump bed door seal 12 is installed on a dump bed door having inside corners, such as a dump truck tailgate 33, it may be necessary to install corner seals 40 to prevent leakage at the corners. Corner seal 40 (FIG. 6) is generally rectilinear and is cylindrically bulbously enlarged along two adjoining perpendicular sides 42, 43. Wedge shaped portion 44 tapers away from corner 48 where adjacent ends of the two cylindrically bulbously enlarged sides 42, 43 interconnect. Cylindrically bulbously enlarged first side 42 and cylindrically bulbously enlarged second side 43 each define an axial dowel channel 45 to carry one end portion of a connecting dowel 27 for interconnecting first side 42 of the corner seal 40 to an adjacent end of a sealing member 12 and for interconnecting second side 43 of the corner seal 40 to a second adjacent sealing member 12. (See FIG. 9). At least one fastener hole 21 is defined in the wedge shaped portion 44 for a fastener 22 to affix the corner seal 40 to the tailgate 33.

Recess 41 may be defined in the wedge shaped portion 44 to carry a corner fastening plate 47. The corner fastening plate 47, preferably formed of spring steel or the like and defining at least one fastener hole 21, functions similar to the anchoring strap 20 to "sandwich" the corner seal 40 between the fastening plate 47 and the dump bed tailgate 33.

Connecting dowel 27 is preferably formed of similar high density plastic such as polyethylene, nylon or vinyl to reduce corrosion, but may also be metallic, and is carried partially within the central dowel channel 45 of the sealing member 12 and also partially within the dowel channel 45 of the corner seal 40 to interconnect the adjacent end portions. Lengths of connecting dowel 27, which may define threads to enhance engagement, may also be used to interconnect adjacent end portions of sections of sealing member 12, such as when the length of single section of sealing member 12 is not sufficient to span the length of a dump bed door 31. Larger diameter connecting dowels 27 (not shown) may be used to interconnect adjacent end portions of sealing member 12 sections that do not have rigidity enhancing structures 32 within the medial channel 18.

Figure 7:
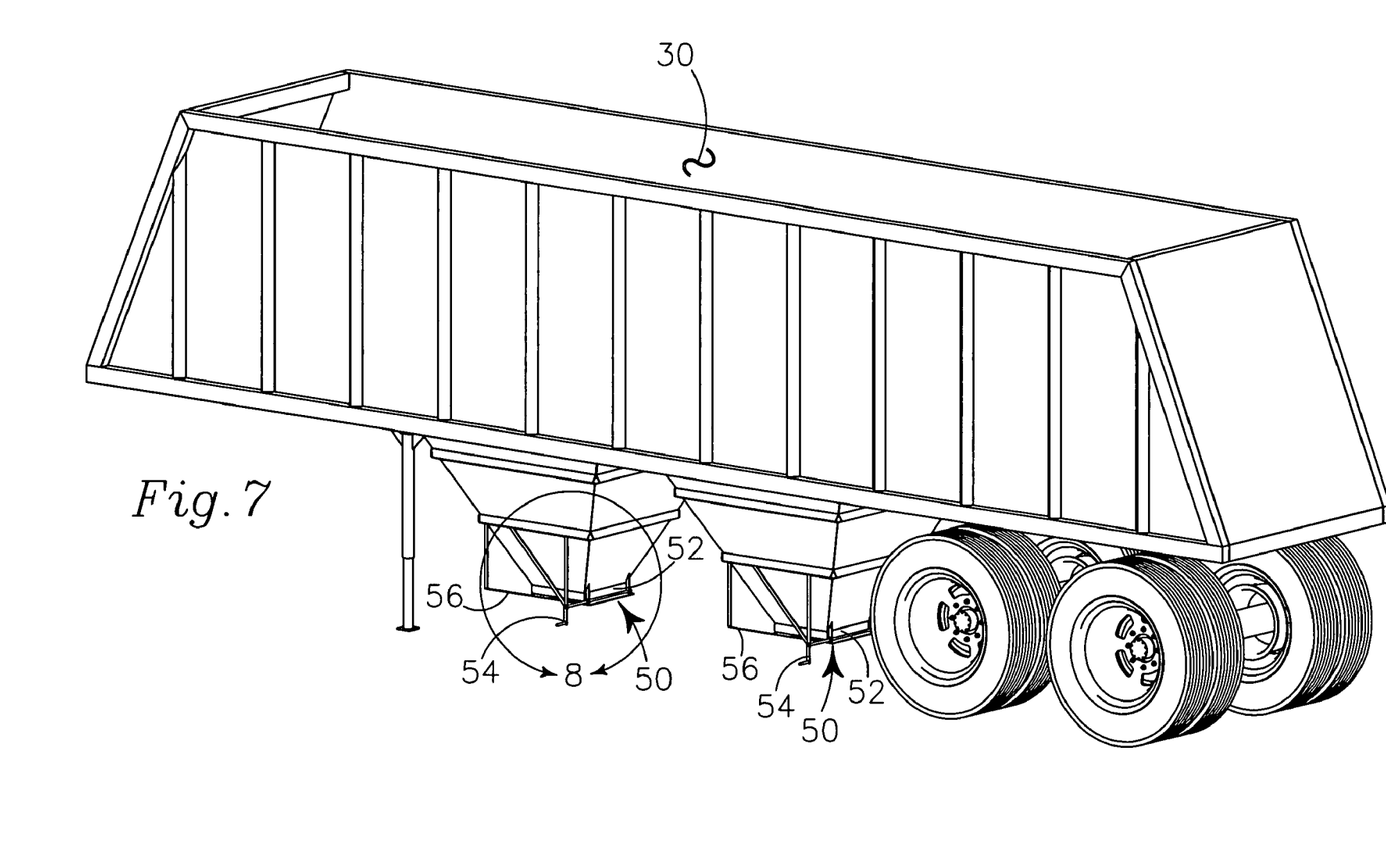
FIG. 7 is an isometric side, top and back view of a hopper type belly dump vehicle having sliding panel doors on which my dump bed door seal may be installed.

In a third embodiment (FIGS. 7 and 8) my dump bed door seal may also be used to seal a sliding panel type door 50 that is used in some over the road vehicles and also in some railroad cars that carry bulk materials. Such over the road vehicles and railroad cars are commonly called "hopper cars". A sliding panel type door 50 commonly provides a rectilinear door panel 51 held in a generally horizontal orientation by a peripherally extending frame 52. Parallel spaced apart rails 56 carry peripheral edge portions of the door panel 51. The rails 56 are elongated so that the door panel 51 is movable therealong adjacent the frame 52 from a first position wherein the door panel 51 closes an orifice 53 communicating with a dump bed 30 thereabove, to a second position wherein the orifice 53 is unobstructed and open. Mechanical advantage to move the door panel 51 between closed and open positions may be provided by a hand crank 54 turning a sprocket 55 that operatively communicates with at least one sprocket track (not shown). Other known types of manual or automatic mechanisms may likewise assist in moving the door panel 51 between open and closed positions.

As shown in FIG. 8, sealing member 12 sections are affixed with plural fasteners 22 to the frame 52 about the periphery of the orifice 53 with the bulbous portion 16 slightly overhanging inner peripheral edges of the frame 52. Ends of the sealing member sections 12 are cut at angles to fit closely against an end of an adjacent sealing member 12 at the corners of the frame 52 to prevent leakage at the corners. Anchoring strap 20 is carried in indentation 15. Weight of the material carried within the dump bed 30 above the door panel 51 presses downwardly upon the bulbous portion 16 and upon the door panel 51. Weight of the material carried within the dumb bed 30 deforms the bulbous portion 16 by squeezing the bulbous portion 16 against the door panel 51 effectively providing a seal therebetween.

It is also envisioned that sections of the second embodiment (FIG. 5) of the sealing member 12 may be affixed to the frame 52 around the sliding panel door orifice 53. Segments of the anchoring strap 20 need not be independently attached because the anchoring strap 20 is incorporated into the sealing member 12. It is further envisioned that the sealing member 12 for a sliding panel type door 50 be formed into a unitary "picture frame" like member (not shown) having a rectilinear configuration. The "picture frame" like member is affixed to the frame 52 around the periphery of the orifice 53 as a single unitary element and does not require corner joints. "Picture frame" like seals may be specifically designed and manufactured to fit specific sliding panel type doors 50 such as a rail road car hopper door or doors made by specific manufacturers.

Having described the structure of my dump bed door seal, its operation may be understood.

A dump bed door 31 to which the dump bed door seal is to be installed is opened and secured in the open position, such as with blocking, to prevent unintentional closing while the dump bed door seal is being installed.

A length of sealing member 12 is positioned adjacent an edge of the dump bed door 31, 33, 50 that is adjacent a dump bed surface when the dump bed door 31, 33 is closed. The sealing member 12 is positioned so that a portion of the bulbous portion 16, diametrically opposite the planar portion 13, slightly overhangs edge of the dump bed door 31. (FIG. 4). While the sealing member 12 is held in position a marking device, (not shown), is inserted into at least two of the fastener holes 21 to mark the location for holes (not shown) to be drilled into the dump bed door 31. The length of sealing member 12 is removed and appropriately sized holes are drilled at the locations of the previously made marks.

The sealing member 12 is repositioned on the dump bed door 31 and the fastener holes 21 are aligned with the drilled holes. (not shown).

The anchoring strap 20 is positioned in the elongate recess 15 and the fastener holes 21 defined therein are aligned with the fastener holes 21 defined in the sealing member 12 and the previously drilled holes. A fastener 22, such as a self-tapping screw with a low profile head is inserted into the aligned holes 21 and threaded into the drilled holes (not shown). Similar holes (not shown) are drilled into the dump bed door 31 at the locations of the other spacedly arrayed fastener holes 21 and similar fasteners 22 are installed therein to positionally secure the sealing member 12. It is preferable that head portions of the fasteners 22 be countersunk so the heads do not extend above the anchoring strap 20. Countersinking the head portions reduces the likelihood of material "catching" on the sealing member 12 when the dump bed 30 is emptied. Fasteners 22 may be removable, or may be permanent such as rivets, or the fasteners 22 may have cooperating fastening elements such as threaded nuts to secure the sealing member 12 and anchoring strap 20 in position.

The slight overhang of the bulbous portion 16 over terminal edge portion of the dump bed door 31 causes the bulbous portion 16 to first deform and then "pop up" onto adjoining dump bed surface 29 when the dump bed door 31 is closed as force vectors of the closing door 31 act upon the curvilinear overhanging portion of the bulbous portion 16. The circumferential surface 17 of the bulbous portion 16 rests upon the adjoining dump bed surface 29 while the dump bed door 31, tailgate 33 and sliding panel door 50 is in a closed orientation. The resilient deformability of the sealing member 12 permits flexing and deformation as the bulbous portion 16 engages with and disengages from the adjoining dump bed surface 29.

If the dump bed door seal 12 is installed on a sliding panel type door 50 on a hopper car, the door seal 12 is secured to the frame 52 about the periphery of the door orifice 53 with the bulbous portion 16 extending slightly into the orifice 53 over the terminal edge of the frame 52. Preferably the circumferential surface 17 of the bulbous portion 16 adjacent the frame 52 extends downwardly partially into the orifice 53. The door panel 51, when closed, should be in direct frictional contact with the circumferential surface 17 of the bulbous portion 16. Fasteners 22 are installed in holes (not shown) defined in the frame 52 to secure the sealing member 12 about the orifice 53.

If the dump bed door seal is installed on a tailgate 33 having inside corners (FIGS. 2 and 9) the first or second embodiment may be used and lengths of the sealing member 12 are installed on a lower horizontal edge portion 33a of the tailgate 33 as well as on opposing vertical edges 33b of the tailgate 33.

The method of installation on the tailgate 33 is similar to the method described above, except that the sealing member 12 is positioned, when marking the location of the fastener holes 21, with the portion of the bulbous portion 16 diametrically opposite the planar portion 13 slightly overhanging a line 25 where the tailgate 33 meets the adjoining dump bed surface 29. (FIG. 2). In addition, corner seals 40 should be installed at the lower outer corners of the tailgate 33. The first side 42 and second side 43 of the corner seal 40 are positioned with the first side 42 and second side 43 slightly overhanging lines 25 where vertical and horizontal adjacent dump bed surfaces 29 meet the tailgate 33. A marking device is use to mark the locations for fastener holes 21 and once marked, holes are drilled at the previously marked locations.

As shown in FIG. 9, one end portion of a connecting dowel 27 is inserted axially into the central dowel channel 45 of the sealing member 12 mounted at the lower horizontal edge 33a of the tailgate 33, and the opposing end portion of the connecting dowel 27 is inserted into the dowel channel 45 of one side 42, 43 of the corner seal 40. The dowel 27 installation process is repeated for the sealing member 12 mounted adjacent the vertical edges 33b of the tailgate 33. The corner fastening plate 47 is placed in the recess 41 defined in the wedge shaped portion 44 and fasteners 22 are used to affix the corner seal 40 in position. The sealing members 12 along the vertical edges 33b of the tailgate 33 are thereafter installed in a similar manner.

When the dump bed 30 is loaded with material, such as grain, sand, gravel, coal or the like, a portion of the weight of the material rests directly upon and crushes the bulbous portion 16 against the adjoining dump bed surface 29. The crushing deformation of the bulbous portion 16 collapses the bulbous portion 16 sealing and bridging gaps and irregular openings between the adjoining surfaces.

When the dump bed door 30 is opened, the bulbous portion 16 is withdrawn from the adjoining dump bed surface 29, or the door panel 51 is withdrawn from engagement with the bulbous portion 16, and the material within the dump bed 30 may pass thereover as the material exits the dump bed 30. Once the dump bed 30 is empty, the resiliency of the material forming the sealing member 12 allows the bulbous portion 16 and the flexing area 19 to substantially return to an original configuration once the deformation pressure is removed. The dump bed door 31, tailgate 33 or door panel 51 is closed and when the dump bed 30 is refilled with material, the weight of the material acting upon the sealing member 12 reseals any gaps that might allow leakage of material therethrough.

Having thusly described my invention, what I desire to protect by Letters Patent, and What I claim is:

1. A seal for a dump bed door for sealing openings adjacent the dump bed door comprising in combination:
   a resiliently deformable elongate sealing member having
      a generally planar portion with a first side and an opposing second side,
      a resiliently deformable cylindrically enlarged portion at one elongate edge of the planar portion, and
      a medial channel defined by the cylindrically enlarged portion;
   an anchoring strap communicating with the planar portion; and
   at least one fastener extending through the generally planar portion positionally securing the dump bed door seal when the dump bed door is closed so that weight of material carried within the dump bed deforms the sealing member to seal at least one of said openings.

2. The seal for a dump bed door of claim 1 wherein:
   material of the elongate sealing member comprises vinyl.

3. The seal for a dump bed door of claim 1 wherein:
material of the elongate sealing member comprises polyethylene.

4. The seal for a dump bed door of claim 1 wherein:
material of the elongate sealing member comprises nylon.

5. The seal for a dump bed door of claim 1 wherein:
an elongate edge of the planar portion opposite the cylindrically enlarged portion is tapered to minimize catching material passing thereover.

6. The seal for a dump bed door of claim 1 further comprising:
a recess defined in the planar portion to carry the anchoring strap flush with one side of the planar portion.

7. The seal for a dump bed door of claim 1 further comprising:
a rigidity enhancing structure within the medial channel to decrease deformation of the cylindrically enlarged portion.

8. The seal for a dump bed door of claim 1 further comprising:
at least one connecting dowel carried partially within the medial channel of the cylindrically enlarged portion to interconnect adjacent end portions of an elongate sealing member.

9. The seal for a dump bed door of claim 1 further comprising:
a corner seal having two cylindrically enlarged edge portions at adjoining perpendicular edges;
a wedge portion opposite the cylindrically enlarged edge portions defining at least one hole for a fastener; and
a channel defined by the cylindrically enlarged edge portions to carry a portion of a connecting dowel to interconnect the corner seal to an adjacent sealing member.

10. The seal for a dump bed door of claim 1 wherein:
closing the dump bed door causes an outer circumferential surface of the cylindrically enlarged portion to frictionally communicate with a surface adjacent the closed dump bed door.

11. The seal for a dump bed door of claim 1 wherein:
the dump bed door seal is affixed to a belly dump door of a belly dump vehicle.

12. The seal for a dump bed door of claim 1 wherein:
the dump bed door seal is affixed to a frame of a sliding panel door of a hopper vehicle.

13. The seal for a dump bed door of claim 1 wherein:
the dump bed door seal is affixed to a tailgate of a dump truck.

14. The seal for a dump bed door of claim 1 wherein:
the first and opposing second sides of the planar portion are angled relative to each other and have a unitary edge opposite the cylindrically enlarged portion and each angled side interconnects with the cylindrically enlarged portion opposite the unitary edge at spaced apart positions on the cylindrically enlarged portion.

15. The seal for a dump bed door of claim 1 wherein:
the anchoring strap is carried between the first and opposing second sides of the generally planar portion.

16. The seal for a dump bed door of claim 1 wherein:
the generally planar portion defines an arc between the cylindrically enlarged portion and the an elongate edge opposite the cylindrically enlarged portion.

17. A seal for a dump bed door for sealing openings adjacent the dump bed door comprising in combination:
a resiliently deformable elongate sealing member having
a generally planar portion with a first side and an opposing second side,
a resiliently deformable cylindrically enlarged portion at one elongate edge of the
planar portion, and
a medial channel defined by the cylindrically enlarged portion; and
at least one fastener extending through the generally planar portion positionally securing the dump bed door seal when the dump bed door is closed so that weight of material carried within the dump bed deforms the sealing member to seal the at least one of said openings.

18. The seal for a dump bed door of claim 17 wherein:
the resilient deformability of the elongate sealing member varies between the cylindrically enlarged portion and an elongate edge of the generally planar portion opposite the cylindrically enlarged portion.

\* \* \* \* \*